United States Patent Office 3,216,906
Patented Nov. 9, 1965

3,216,906
METHOD FOR PRODUCING GLUTAMINE BY FERMENTATION PROCESS
Shukuo Kinoshita, Katsunobu Tanaka, and Kazuo Oshima, Tokyo, and Kazuo Kimura, Kamitsuruma, Sagamihara-shi, Japan, assignors to Kyowa Hakko Kogyo Co. Ltd., Tokyo, Japan, a corporation of Japan
No Drawing. Filed Aug. 3, 1962, Ser. No. 214,513
3 Claims. (Cl. 195—29)

This invention relates generally to a method for the microbiological production of L(+)-glutamine. Particularly, it relates to a process for the direct production of L-glutamine from saccharoid and nitrogen sources by fermentation. Still more particularly, it is concerned with a method for obtaining high yield of L-glutamine by fermentation culturing a glutamic acid producing microorganism in a suitable nutrient medium containing a high concentration of ammonium ion.

The present inventors have previously discovered microorganisms which produce glutamic acid directly in a high yield in a culturing medium containing saccharoid and nitrogen source, as well as an industrial method for producing glutamic acid by use of these microorganisms. (See United States Patent No. 3,003,925).

The inventors have further examined a method for directly accumulating glutamine in a culturing medium in a substantial amount using these strains, and now discovered that these microorganisms can produce and accumulate a remarkable amount of glutamine in a culturing medium when the medium essentially contains saccharoid and a nitrogen source, such as ammonium salts, etc., in an amount higher than that required for the growth of the microorganism and for the production of glutamic acid.

Thus, an object of the invention is to provide a method for producing glutamine at moderate prices by use of low-priced nitrogen source, such as ammonium salts, and saccharoid. Another object of the invention is to provide a method for producing glutamine directly in a liquid culturing medium. Other objects are apparent from the following description.

To carry out the method of the invention, various starchy materials, such as potato, sweet potato, wheat, corn, and the like, starch obtained therefrom, its saccharified liquor, sucrose, glucose, lactose, molasses, and the like, can be employed as the saccharoid. As the nitrogen source, various inorganic nitrogen compounds, such as ammonium sulfate, ammonium chloride, ammonium nitrate, ammonium phosphate, ammonium carbonate, ammonium tartrate, ammonium acetate, ammonium hydroxide, gaseous ammonia, and the like, as well as organic nitrogen compounds, such as urea and the like, can be employed. In other words, any kind of such compounds can be employed as long as the nitrogen is available by the strain to be used.

The fermentation may be effected under aerobic condition, for example by a culture by shaking or by agitation and aeration. Suitable temperature range for the culture is from 24° to 37° C., particularly from 28° to 33° C.

To obtain glutamine in high yield, it is preferable to adjust the pH of culturing medium within the range of from 5.5 and 8.5 by addition of a neutralizing agent at the commencement of, or during the course of, culturing. As the neutralizing agent, gaseous or aqueous ammonia, caustic alkali (sodium hydroxide, potassium hydroxide, etc.), ammonium carbonate, calcium carbonate, calcium hydroxide, or others, may be used. Addition of urea to supply ammonia and, at the same time, to adjust the pH, is more effective for the production of glutamine.

After a culturing period of 2 to 3 days, a remarkable amount of glutamine is accumulated in the culture medium as the main product. The cultured liquor is filtered. Glutamine in the filtrate is adsorbed onto an ion-exchange resin, and then eluted. The eluate is concentrated while being kept almost neutral; an alcohol is added thereto; the products is cooled to crystallize glutamine, which is separated by centrifugation and further purified by recrystallization to give pure glutamine.

Essentially, strains employed in the invention are of glutamic acid- producing microorganisms. In the production of glutamic acid from saccharoid and an ammonia source, they need, of course, supply of an amount of ammonium ion necessary for the formation of the amino radical in glutamic acid. To secure the accumulation of glutamic acid in high yield, the supply of the ammonium ion is better carried out portionwise in a continuous way, since the production of glutamic acid is suppressed if the ammonium ion is present in the culturing liquor in a higher concentration than that required for the formation of glutamic acid. On the contrary, when the ammonium ion is present in the culturing liquor in a much higher concentration, a remarkable amount of glutamine is accumulated in the culturing liquor, with decrease of the accumulation of glutamic acid.

An experimental result showing the relationship between the amount of nitrogen added and the formation of glutamine and glutamic acid is set forth in Table 1.

TABLE 1

| Ammonium sulfate added, percent | Glutamine, mg./ml. | Glutamic acid, mg./ml. | Cell weight, mg./ml. |
|---|---|---|---|
| 1.0 | 2.0 | 20 | 10.0 |
| 2.0 | 5.4 | 11.0 | 11.0 |
| 3.0 | 7.0 | 8.0 | 11.0 |
| 4.0 | 10.0 | 3.0 | 10.0 |
| 5.0 | 12.0 | 2.0 | 12.0 |
| 6.0 [1] | 13.0 | 1.0 | 11.3 |
| 7.0 [1] | 14.0 | 2.0 | 11.4 |
| 8.0 [1] | 13.0 | 1.0 | 11.4 |
| 9.0 [1] | 16.0 | 3.0 | 10.0 |
| 10.0 [1] | 15.0 | 2.0 | 10.0 |

[1] Ammonium sulfate is added after the growth of the cells.

In this experiment, *Micrococcus glutamicus* ATCC No. 14751 is cultured in a medium having the following composition under shaking in flasks for 70 hours at 30° C.

Glucose _____ percent__ 10.0
$KH_2PO_4$ _____ do____ 0.05
$K_2HPO_4$ _____ do____ 0.05
$MgSO_4 \cdot 7H_2O$ _____ do____ 0.05
$MnSO_4 \cdot 4H_2O$ _____ do____ 0.002
$FeSO_4 \cdot 7H_2O$ _____ do____ 0.002
Urea _____ do____ 0.5
Biotin _____ $\gamma/l$____ 2.5
$(NH_4)_2SO_4$ (in Table 1).

As shown in Table 1, the present invention converts the usual glutamic acid fermentation to glutamine fermentation by increasing the ammonium ion concentration in the culturing medium up to a level higher than that required for the cell growth and the formation of glutamic acid. It may be said, accordingly, that a novel method for commercial production of glutamine is developed by the present invention.

Thus, the culturing medium employed in the invention contains, besides saccharoid, nitrogen source in an amount higher than that required for the cell growth. The amount of the nitrogen source corresponds to not less than 5 parts by weight of the available nitrogen per 100 parts by weight of the available carbon in the medium.

In the method of the present invention, addition of the excess amount of nitrogen source either at the initial stage of culturing or after the propagation of cells is effective. In case of using a particularly high concentration of, e.g. ammonium sulfate, addition after the propagation of cells is preferred.

There is no limitation as to the microorganism to be used for the fermentation according to the invention, so far as it can produce glutamic acid. Since the fermentation of the invention is effected in the presence of an ammonium salt in a high concentration, as mentioned above, biotin is similarly effective in the production of glutamine as in the glutamic acid fermentation.

The invention is more fully described with reference to the examples, which are, however, set forth merely by way of illustration and not by way of limitation.

*Example 1*

*Micrococcus glutamicus* ATCC No. 14751—other investigators may classify the same organism as either a Micrococcus, a Brevibacterium, a Corynebacterium or a Bacterium—is inoculated to a culture medium containing 2.0% of glucose, 1.0% of peptone, 0.5% of meat extract, and 0.25% of NaCl, and cultured for 24 hours under shaking. The resulting 300 ml. seed culture is inoculated to 3 l. of culture medium of the following composition placed in a 5 l. volume fermentation vessel.

| | | |
|---|---|---|
| Glucose | percent | 10.0 |
| $(NH_4)_2SO_4$ | do | 4.0 |
| $KH_2PO_4$ | do | 0.05 |
| $K_2HPO_4$ | do | 0.05 |
| $MgSO_4 \cdot 7H_2O$ | do | 0.05 |
| $MnSO_4 \cdot 4H_2O$ | do | 0.002 |
| $FeSO_4 \cdot 7H_2O$ | do | 0.002 |
| Urea | do | 0.5 |
| Biotin | γ/l | 2.5 |
| $CaCO_3$ | percent | 2.0 |

The inoculated medium is incubated at 30° C. with 600 r.p.m. stirring while air is passed through it at the rate of about 3 l./min. Glutamine in the medium increases significantly from about 38 hours, and reaches a maximum after 70 hours, namely: 15 mg./ml. The amount of glutamic acid produced at this time is 7.0 mg./ml. The cultured medium is filtered, concentrated under reduced pressure at neutral conditions, and adjusted to pH 3 to 4 by addition of an acid, whereby glutamic acid in the liquor is crystallized out. After the removal of the acid, glutamine in the liquor is adsorbed onto an ion-exchange resin, and eluted. The eluate is concentrated; ethyl alcohol is added thereto; and the product is cooled to yield 35 g. of crude crystal of glutamine.

*Example 2*

*Micrococcus glutamicus* ATCC No.14752 is inoculated to 300 ml. of a culturing medium of the following composition placed in a 2000 ml. volume Erlenmeyer flask, and cultured at 30° C. under shaking.

| | | |
|---|---|---|
| Glucose | percent | 10.0 |
| $NH_4Cl$ | do | 4.0 |
| $KH_2PO_4$ | do | 0.05 |
| $K_2HPO_4$ | do | 0.05 |
| $MgSO_4 \cdot 7H_2O$ | do | 0.05 |
| $MnSO_4 \cdot 4H_2O$ | do | 0.002 |
| $FeSO_4 \cdot 7H_2O$ | do | 0.002 |
| Urea | do | 0.5 |
| Biotin | γ/l | 1.0 |
| Thiamine | mg./l | 1 |
| $CaCO_3$ | percent | 2.0 |

After 72 hours' culturing, the amount of glutamine produced is 23 mg./ml. The treatment of the cultured medium as in Example 1 gives 5.0 g. of glutamine.

*Example 3*

The culturing of Example 1 is repeated, but the concentration of $(NH_4)_2SO_4$ in the composition of the culturing medium is changed to 0.5%, and $(NH_4)_2SO_4$ is added to the culturing medium after the propagation of the cells (after 20 hours from the commencement of the culturing) so as to make the concentration 6%. After 3 days culturing, 18 mg./ml. of glutamine is produced.

*Example 4*

A strain of *Bacillus subtilis* is inoculated to 20 ml. of a culturing medium of the following composition placed in 250 ml. volume Erlenmeyer flask.

| | | |
|---|---|---|
| Glucose | percent | 5.0 |
| $(NH_4)_2SO_4$ | do | 3.0 |
| $KH_2PO_4$ | do | 0.05 |
| $K_2HPO_4$ | do | 0.05 |
| Yeast extract | do | 0.1 |
| $MgSO_4 \cdot 7H_2O$ | do | 0.05 |
| $MnSO_4 \cdot 4H_2O$ | do | 0.002 |
| $FeSO_4 \cdot 7H_2O$ | do | 0.001 |
| $CaCO_3$ | do | 2.0 |
| pH | | 7.0 |

After 72 hours' culturing under shaking at 28° C., 1 mg./ml. of glutamine is produced.

*Example 5*

*Escherichia coli* No. 128 strain is cultured as in Example 4. After 60 hours culturing 1.5 mg./ml. of glutamine is produced.

*Example 6*

A strain of *Streptomyces tanashiensis* is cultured similarly as in Example 4, except that acid-saccharified solution of sweet potato starch is used as the saccharoid. After 82 hours' culturing, 2 mg./ml. of glutamine is produced.

*Example 7*

A strain of *Torulopsis utilis* is cultured as in Example 4. After 78 hours' culturing, 1.2 mg./ml. of glutamine is produced.

*Example 8*

*Aspergillus oryzae* No. 3216 strain is inoculated to a medium prepared by dissolving 100 g. of glucose, 2 g. of corn steep liquor, 40 g. of $(NH_4)_2SO_4$, 1 g. of $K_2HPO_4$, 0.5 g. of $MgSO_4 \cdot 7H_2O$, and 20 g. of $CaCO_3$, in one liter of water, and cultured at 33° C. under submerged condition while stirring and passing of air. After 4 days' culturing, 3 mg./ml. of glutamine is produced in the fermentation liquor.

*Example 9*

Using 4.0% of $NH_4Cl$ instead of $(NH_4)_2SO_4$ in the medium of Example 1, a culturing is effected as in Example 1, while pH of the fermentation liquor is controlled by feeding of urea or supply of ammonia gas. After 72 hours' culturing, 25 mg./ml. of glutamine is produced.

What we claim is:

1. A method for producing L-glutamine by fermentation which comprises aerobically culturing a strain of *Micrococcus glutamicus* in a nutrient medium containing available carbon and a higher ammonium ion concentration than that required for the growth of the microorganism and for the production of glutamic acid and at a concentration sufficient to provide available nitrogen in an amount which is at least 5 parts by weight per 100 parts by weight of available carbon in the medium, and controlling the pH of the medium within the range of from about 5.5 to about 8.5 and the temperature of the medium within the range of from about 24° to about 37° C., and recovering the L-glutamine from the fermentation medium.

2. A method according to claim 1 wherein the microorganism is *Micrococcus glutamicus* ATCC No. 14751.

3. A method according to claim 1 wherein the microorganism is *Micrococcus glutamicus* ATCC No. 14752.

References Cited by the Examiner

UNITED STATES PATENTS 2,921,002  1/60  Kita _____ 195—35

OTHER REFERENCES

Fry: Biochemical Journal, vol. 59, No. 4, pages 579 to 589, April 1955.

A. LOUIS MONACELL, *Primary Examiner.*

ABRAHAM H. WINKELSTEIN, *Examiner.*